United States Patent
Wen et al.

(10) Patent No.: US 10,977,076 B2
(45) Date of Patent: Apr. 13, 2021

(54) METHOD AND APPARATUS FOR PROCESSING A HETEROGENEOUS CLUSTER-ORIENTED TASK

(71) Applicant: BEIJING BAIDU NETCOM SCIENCE AND TECHNOLOGY CO., LTD., Beijing (CN)

(72) Inventors: Shengzhao Wen, Beijing (CN); Hanqing Zhou, Beijing (CN); Chuanxiu Liu, Beijing (CN); Jiajun Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 115 days.

(21) Appl. No.: 16/116,624

(22) Filed: Aug. 29, 2018

(65) Prior Publication Data
US 2019/0065251 A1    Feb. 28, 2019

(30) Foreign Application Priority Data
Aug. 31, 2017  (CN) .......................... 201710772904.X (51) Int. Cl.
*G06F 9/48*     (2006.01)
*G06F 8/41*     (2018.01)
*G06F 9/50*     (2006.01)

(52) U.S. Cl.
CPC ............. *G06F 9/4881* (2013.01); *G06F 8/41* (2013.01); *G06F 9/5027* (2013.01); *G06F 9/5072* (2013.01)

(58) Field of Classification Search
CPC ... G06F 9/48–9/4881; G06F 8/40–8/41; G06F 9/50–9/5088
See application file for complete search history.

(56) References Cited

U.S. PATENT DOCUMENTS

2009/0307699 A1*  12/2009  Munshi .................... G06F 9/54
                                              718/102
2014/0245319 A1*  8/2014  Fellows .................... G06F 8/45
                                              718/104
(Continued)

FOREIGN PATENT DOCUMENTS

CN     103186376 A     7/2013
CN     104243617 A    12/2014
(Continued)

OTHER PUBLICATIONS

Steve Crago etal, Heterogeneous cloud computing, 2011, IEEE, pp. 378-385 (Year: 2011).*
(Continued)

*Primary Examiner* — Clayton R Williams
(74) *Attorney, Agent, or Firm* — Brooks Kushman PC (57) ABSTRACT

The present disclosure provides a method and apparatus for processing a heterogeneous cluster-oriented task. The method comprises: receiving a task request and a basic execution environment; scheduling a heterogeneous device according to the task request; compiling the basic execution environment into an execution environment corresponding to the scheduled heterogeneous device, and deploying on the scheduled heterogeneous device; triggering the scheduled heterogeneous device to execute the task request. It is only necessary for the user to provide the basic execution environment with respect to the task, and unnecessary for the user to respectively write a version of execution environment for each type of hardware platform, thereby implementing quick development of the heterogeneous device code and reducing the development and maintenance costs.

12 Claims, 3 Drawing Sheets

(56) References Cited

U.S. PATENT DOCUMENTS

2017/0236037 A1 8/2017 Rhoads et al.
2017/0344387 A1* 11/2017 Fawcett ................ G06F 9/5038

FOREIGN PATENT DOCUMENTS

| CN | 105511933 A | 4/2016 |
| CN | 106529673 A | 3/2017 |
| CN | 105227669 A | 8/2017 |

OTHER PUBLICATIONS

Chinese Office Action dated Mar. 27, 2020, for related Chinese Appln. No. 201710772904.X; 6 Pages.
Chinese Search Report dated Mar. 20, 2020 for related Chinese Appln. No. 201710772904.X; 3 Pages.
Chinese Office Action dated Jun. 17, 2020, for related Chinese Appln. No. 201710772904X; 7 Pages.
Chinese Search Report dated May 26, 2020 for related Chinese Appln. No. 201710772904X; 2 Pages.

* cited by examiner

METHOD AND APPARATUS FOR PROCESSING A HETEROGENEOUS CLUSTER-ORIENTED TASK

The present application claims the priority of Chinese Patent Application No. 201710772904.X, filed on Aug. 31, 2017, with the title of "Method and apparatus for processing a heterogeneous cluster-oriented task". The disclosure of the above applications is incorporated herein by reference in its entirety.

FIELD OF THE DISCLOSURE

The present disclosure relates to computer application technologies, and particularly to a method and apparatus for processing a heterogeneous cluster-oriented task.

BACKGROUND OF THE DISCLOSURE

As big data and deep learning technology develop, science and technology companies pay more and more attention to a method of performing training and learning for massive data by a deep learning method, and finally learning a set of accurate deep model. A more complicated and stronger deep model can deeply reveal complicated and rich information carried in the massive data, and present a more accurate prediction for a future or unknown event. The deep learning application includes speech recognition, image recognition, natural language processing, search advertisement CTR estimation and the like. Since the deep learning application usually depends on massive computation and communication, using a CPU+heterogeneous accelerator (GPU, FPGA, etc.) heterogeneous cluster manner to train and get online already becomes a mainstream manner of supporting the deep learning application.

Since development for the heterogeneous cluster requires the user to have certain mastery of hardware architecture and a specific programming language (e.g., CUDA, OPENCL, MPI). Currently, how to efficiently develop and deploy the deep learning application on the heterogeneous cluster already becomes an important challenge for spreading and accelerating use of the deep learning in fields.

The current solution is mainly developing a specific version with respect to each hardware (GPU, FPGA) of the heterogeneous cluster, and then matching a corresponding hardware for use. However, the solution has problems in the following aspects:

1. The development costs are large: to write hardware device programs, a project developer needs to learn certain hardware knowledge, which does not facilitate quick iteration of software.

2. The maintenance costs are large: since there is a version of code with respect to each hardware platform, it is necessary to maintain multiple portions of codes having a uniform function.

SUMMARY OF THE DISCLOSURE

A plurality of aspects of the present disclosure provide a method and apparatus for processing a heterogeneous cluster-oriented task, which can reduce the development and maintenance costs.

According to an aspect of the present disclosure, there is provided a method for processing a heterogeneous cluster-oriented task, comprising:

receiving a task request and a basic execution environment;

scheduling a heterogeneous device according to the task request;

compiling the basic execution environment into an execution environment corresponding to the scheduled heterogeneous device, and deploying on the scheduled heterogeneous device;

triggering the scheduled heterogeneous device to execute the task request.

The above aspect and any possible implementation mode further provide an implementation mode: the basic execution environment is based on a preset basic hardware device-type heterogeneous high-performance repository.

The above aspect and any possible implementation mode further provide an implementation mode: the task request comprises: an identity of the basic execution environment, configuration information of the task, and data information of the task.

The above aspect and any possible implementation mode further provide an implementation mode: the scheduling a heterogeneous device according to the task request comprises:

scheduling the heterogeneous device for the task request in accordance with the data information of the task in the task request and a sum of available resources of the heterogeneous cluster.

The above aspect and any possible implementation mode further provide an implementation mode: the compiling the basic execution environment into an execution environment corresponding to the scheduled heterogeneous device comprises:

according to the type of the heterogeneous device scheduled for the task request, switching the basic hardware device-type heterogeneous high-performance repository into the heterogeneous high-performance repository corresponding to the scheduled heterogeneous device, and generating the execution environment corresponding to the scheduled heterogeneous device.

The above aspect and any possible implementation mode further provide an implementation mode: the enabling the scheduled heterogeneous device to execute the task request comprises:

sending to the scheduled heterogeneous device a task instruction including data information of the task, so that the scheduled heterogeneous device performs distributed computation according to the task instruction.

According to another aspect of the present disclosure, there is provided an apparatus for processing a heterogeneous cluster-oriented task, comprising:

a receiving module configured to receive a task request and a basic execution environment;

a scheduling module configured to schedule a heterogeneous device according to the task request;

a deploying module configured to compile the basic execution environment into an execution environment corresponding to the scheduled heterogeneous device, and deploy on the scheduled heterogeneous device;

an executing module configured to trigger the scheduled heterogeneous device to execute the task request.

The above aspect and any possible implementation mode further provide an implementation mode: the basic execution environment is based on a preset basic hardware device-type heterogeneous high-performance repository.

The above aspect and any possible implementation mode further provide an implementation mode: the task request comprises: an identity of the basic execution environment, configuration information of the task, and data information of the task.

The above aspect and any possible implementation mode further provide an implementation mode: the scheduling module is specifically configured to:

schedule a heterogeneous device for the task request in accordance with data information of the task in the task request and a sum of available resources of the heterogeneous cluster.

The above aspect and any possible implementation mode further provide an implementation mode: the deploying module is specifically configured to:

according to the type of the heterogeneous device scheduled for the task request, switch the basic hardware device-type heterogeneous high-performance repository into the heterogeneous high-performance repository corresponding to the scheduled heterogeneous device, and generate the execution environment corresponding to the scheduled heterogeneous device.

The above aspect and any possible implementation mode further provide an implementation mode: the executing module is specifically configured to:

send to the scheduled heterogeneous device a task instruction including data information of the task, so that the scheduled heterogeneous device performs distributed computation according to the task instruction.

According to a further aspect of the present disclosure, there is provided a computer device, comprising a memory, a processor and a computer program which is stored on the memory and runnable on the processor, wherein the processor, upon executing the program, implements the above-mentioned method.

According to a further aspect of the present disclosure, there is provided a computer-readable storage medium on which a computer program is stored, wherein the program, when executed by a processor, implements the aforesaid method.

As can be seen from the above introduction, according to the solutions of the present invention, compiling the basic execution environment into the execution environment corresponding to the scheduled heterogeneous device only requires the user to provide the basic execution environment with respect to the task, and does not require the user to respectively write a version of execution environment for each type of hardware platform, thereby implementing quick development of the heterogeneous device code and reducing the development and maintenance costs.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

Figure 1:
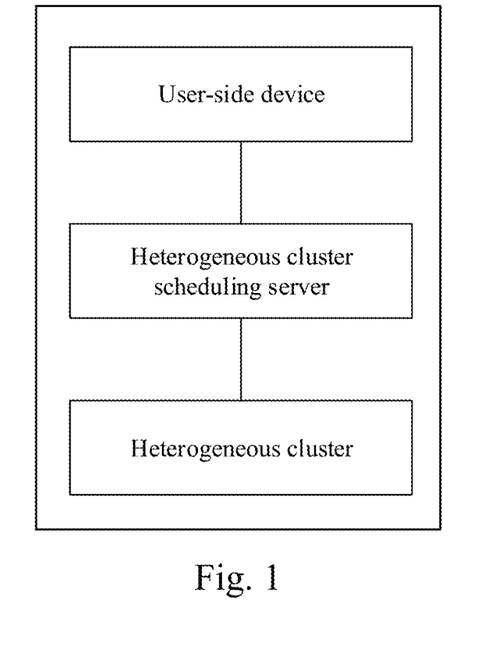
FIG. 1 is a schematic diagram of a system architecture involved in the present disclosure.

To facilitate the understanding of the present disclosure, first, description is presented for a system architecture involved in the present disclosure. As shown in FIG. 1, the system provided by the present disclosure mainly comprises: a user-side device, a heterogeneous cluster scheduling server and a heterogeneous cluster. In embodiments of the present disclosure, a user such as a developer may use the user-side device to implement task development, and the task is finally executed by computing nodes in the heterogeneous cluster. The heterogeneous cluster scheduling server mainly functions in the following two aspects in embodiments of the present disclosure: first, implement the scheduling of the heterogeneous cluster based on a task request from the user-side device; secondly, implement transformation from a task developed based on a basic execution environment into a task developed based on a heterogeneous device execution environment.

Computing nodes in the heterogeneous cluster are responsible for executing an allocated task; the computing nodes may be a heterogeneous device such as CPU, GPU, FPGA or ARM. The computing nodes may be connected with the heterogeneous cluster scheduling server through for example RDMA remote direct data access or TCP communication. The user may submit a task request to the heterogeneous cluster scheduling server through a Web front end. In the embodiment of the present disclosure, the involved task may be any task that may be achieve based on a heterogeneous network. In the embodiment of the present disclosure, description is given by taking a deep learning network training task as an example, for example, deep learning network training such as speech recognition, image recognition, natural language processing, and search advertisement CTR estimation.

Figure 2:
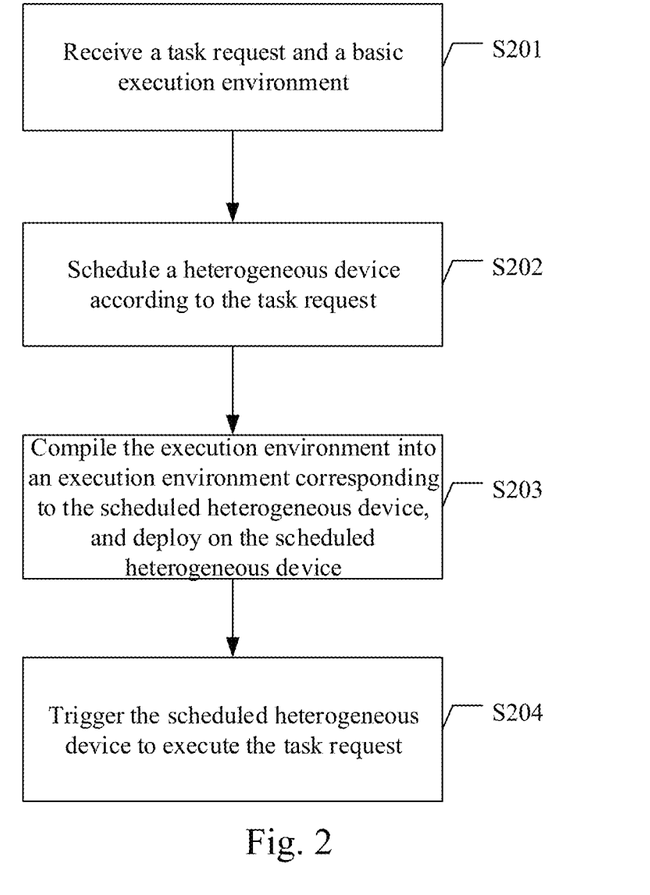
FIG. 2 is a flow chart of a method for processing a heterogeneous cluster-oriented task according to the present disclosure.

FIG. 2 is a flow chart of a method for processing a heterogeneous cluster-oriented task according to the present disclosure. As shown in FIG. 2, the method comprises:

Step S201: receiving a task request and a basic execution environment;

Step S202: scheduling a heterogeneous cluster according to the task request;

Step S203: compiling the basic execution environment into an execution environment corresponding to the scheduled heterogeneous device, and deploying on the scheduled heterogeneous device;

Step S204: triggering the scheduled heterogeneous device to execute the task request.

A subject for executing the method in FIG. 2 is a heterogeneous cluster scheduling server.

The basic execution environment is an execution environment constructed by a developer based on a basic hardware device-type heterogeneous high-performance repository. In the embodiment, it is feasible to regard the CPU as a basic hardware device type, namely, construct the execution environment based on the heterogeneous high-performance repository of CPU version, or construct the basic execution environment based on a GPU, FPGA, or ARM-type heterogeneous high-performance repository.

The heterogeneous high-performance repository supports many types of hardware device computation (e.g., CPU, GPU, FPGA, and ARM) and communication (e.g., RDMA remote direct data access, and TCP). The high-performance repository is comprised of highly-optimized algorithm building modules, and adapted for all data analysis phases (pre-processing, conversion, analysis, modeling, verification and decision-making). The high-performance repository is specifically used for common data platforms including Hadoop and Spark, and can improve the data access efficiency.

In a preferred implementation mode of step S201,

The task request comprises information such as execution environment identity, configuration information of the task, and data information of the task.

The task may be a parallel operation task or a deep learning network training task.

Take the deep learning network training task as an example. The task request comprises information such as execution environment identity, a network configuration of the task, and training information of the task. Preferably, the training information of the task comprises: a storage path of the training data in a shared memory, and training parameters of deep learning.

Regarding the storage path, the training data may be stored in the shared memory, e.g., a distributed file system (HDFS). Therefore, the user may provide an address of the training data on the HDFS, and configure a file name list of the training data.

The training parameters of the deep learning specifically refers to configuration requirements related to computing nodes for operating a deep learning framework. For example, the training parameters may include at least one of the number of threads of each node, an update interval, whether to perform thermal activation and/or whether to automatically adjust parameters.

While the task request is submitted, the execution environment is packed and submitted to the heterogeneous cluster scheduling server. Noticeably, it is necessary to ensure that the execution environment in the CPU repository version can operate normally.

In a preferred implementation mode of the present embodiment, it is feasible to pre-construct the basic execution environment based on the heterogeneous high-performance repository of the CPU version, and set an identifier for the basic execution environment and store the identifier in the shared memory. When the heterogeneous cluster scheduling server receives the task request, a corresponding execution environment is downloaded from the shared memory according to the execution environment identifier in the task request.

Preferably, the user may perform task request submission in a command line mode or by employing a visualization interface at a front end of the web.

In a preferred implementation mode of step S202,

The heterogeneous cluster scheduling server schedules heterogeneous device resources for the task request in accordance with data information in the task request and a sum of available resources of the heterogeneous cluster.

Take the deep learning network training task as an example. The heterogeneous cluster scheduling server schedules heterogeneous device resources for the task request in accordance with training information in the task request and a sum of available resources of the heterogeneous cluster; preferably, a heterogeneous cluster resource management server may employ a three-level scheduling mode, and determine the number of desired heterogeneous devices according to a size of training data of the deep learning task and a computing capability of the heterogeneous devices. For example, when the data is smaller than 10 GB, the data is scheduled to a single heterogeneous device for operation; when the data is larger than 10 GB and less than 1 TB, the data is scheduled to four heterogeneous devices for operation; when the data is larger than 1 TB, the data is scheduled to the whole heterogeneous cluster for operation.

If the sum of the available resources of the heterogeneous cluster cannot meet the task request, the task request is enabled to enter a waiting state.

If the sum of the available resources of the heterogeneous cluster can meet the task request, it is feasible to schedule the heterogeneous device for the task request, and regard the heterogeneous device as a computing node.

In a preferred implementation mode of step S203,

The compiling the basic execution environment into an execution environment corresponding to the scheduled heterogeneous device comprises:

according to the type of the heterogeneous device scheduled for the task request, the heterogeneous cluster scheduling server switches the heterogeneous high-performance repository of the CPU version into the heterogeneous high-performance repository of a version corresponding to the scheduled heterogeneous device, and construct the execution environment corresponding to the type of the scheduled heterogeneous device and packs and deploys the execution environment on the scheduled heterogeneous device.

For example, when the heterogeneous device scheduled by the heterogeneous cluster scheduling server for the task request is one or more of the GPU, FPGA and ARM, it is necessary to switch the heterogeneous high-performance repository of the CPU version into the heterogeneous high-performance repository of the GPU, FPGA or ARM version corresponding to the scheduled heterogeneous device; when the heterogeneous device scheduled by the heterogeneous cluster scheduling server for the task request is GPU, it is unnecessary to switch the heterogeneous high-performance repository of the CPU version.

Take the deep learning network training task as an example. A deep learning network including a training network and a testing network is generated by using the execution environment according to the network configuration of the task in the task request.

The training network is a deep learning network structure used by during execution of the training task, and the testing network is a deep learning network structure used upon prediction. Specific structures and related parameters of the training network and testing network may be modified and defined according to needs.

In a preferred implementation mode of step S204, the heterogeneous cluster scheduling server, according to the task request, generates a task instruction instructing the scheduled heterogeneous device to perform distributed computation.

Take the deep learning network training task as an example. The heterogeneous cluster scheduling server, according to the training information of the task request, generates a task instruction instructing the scheduled heterogeneous device to perform distributed training for the deep learning network.

Specifically, it is feasible to send the task instruction to the scheduled heterogeneous device, trigger the scheduled heterogeneous device to obtain the training data from the shared memory according to the training information of the task in the task instruction, and train the deep learning network.

In a preferred implementation mode of the present embodiment, during execution of the task, the user may view, in real time, an execution progress for the task request through a front-end page provided by the heterogeneous cluster scheduling server;

preferably, the heterogeneous cluster scheduling server periodically sends a task status query request to the scheduled heterogeneous device; obtains an execution progress for the task request found by the scheduled heterogeneous device by querying according to the task status query request. The heterogeneous cluster scheduling server, through the front-end page of the Web, provides the user with the scheduled heterogeneous device's execution progress for the task request.

Preferably, the scheduled heterogeneous device regularly sends the execution progress for the task request to the heterogeneous cluster scheduling server, and the heterogeneous cluster scheduling server, through the front-end page of the Web, provides the user with the scheduled heterogeneous device's execution progress for the task request.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

Figure 3:
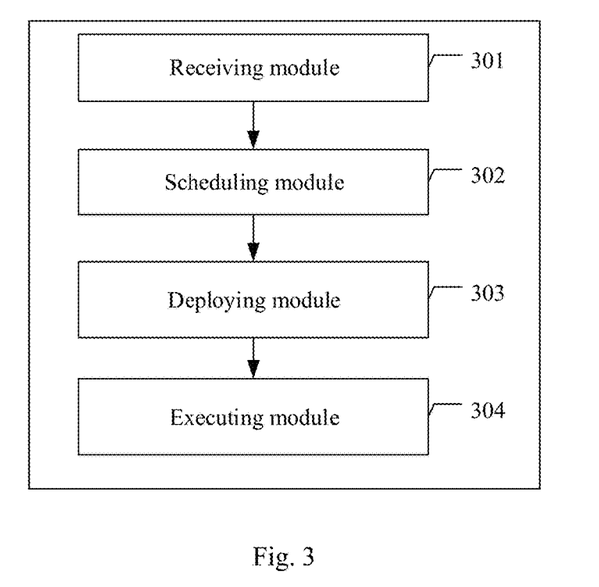
FIG. 3 is a block diagram of an apparatus for processing a heterogeneous cluster-oriented task according to the present disclosure.

FIG. 3 is a block diagram of an apparatus for processing a heterogeneous cluster-oriented task according to the present disclosure. The apparatus may be disposed in the heterogeneous cluster scheduling server and used to complete operations in the method embodiment shown in FIG. 2. As shown in FIG. 3, the apparatus comprises:

a receiving module 301 configured to receive a task request and a basic execution environment;

a scheduling module 302 configured to schedule a heterogeneous cluster according to the task request;

a deploying module 303 configured to compile the basic execution environment into an execution environment corresponding to the scheduled heterogeneous device, and deploy on the scheduled heterogeneous device;

an executing module 304 configured to trigger the scheduled heterogeneous device to execute the task request.

The basic execution environment is an execution environment constructed by a developer based on a basic hardware device-type heterogeneous high-performance repository. In the embodiment, it is feasible to regard the CPU as a basic hardware device type, namely, construct the execution environment based on the heterogeneous high-performance repository of CPU version, or construct the basic execution environment based on a GPU, FPGA, or ARM-type heterogeneous high-performance repository.

The heterogeneous high-performance repository supports many types of hardware device computation (e.g., CPU, GPU, FPGA, and ARM) and communication (e.g., RDMA remote direct data access, and TCP). The high-performance repository is comprised of highly-optimized algorithm building modules, and adapted for all data analysis phases (pre-processing, conversion, analysis, modeling, verification and decision-making). The high-performance repository is specifically used for common data platforms including Hadoop and Spark, and can improve the data access efficiency.

In a preferred implementation mode of the receiving module 301,

The task request comprises information such as execution environment identity, configuration information of the task, and data information of the task.

Take the deep learning network training task as an example. The task request comprises information such as execution environment identity, a network configuration of the task, and training information of the task.

Preferably, the training information of the task comprises: a storage path of the training data in a shared memory, and training parameters of deep learning.

Regarding the storage path, the training data are all stored in the shared memory, e.g., a distributed file system (HDFS). Therefore, the user may provide an address of the training data on the HDFS, and configure a file name list of the training data.

The training parameters of the deep learning specifically refers to configuration requirements related to computing nodes for operating a deep learning framework. For example, the training parameters may include at least one of the number of threads of each node, an update interval, whether to perform thermal activation and/or whether to automatically adjust parameters.

While the task request is submitted, the execution environment is packed and submitted to the heterogeneous cluster scheduling server. Noticeably, it is necessary to ensure that the execution environment in the CPU repository version can operate normally.

In a preferred implementation mode of the present embodiment, it is feasible to pre-construct the execution environment of the heterogeneous high-performance repository based on the heterogeneous high-performance repository of the CPU version, and set an identifier for the execution environment and store the identifier in the shared memory. When the heterogeneous cluster scheduling server receives the task request, a corresponding execution environment is downloaded from the shared memory according to the execution environment identifier in the task request.

Preferably, the user may perform task request submission in a command line mode or by employing a visualization interface at a front end of the web.

In a preferred implementation mode of the scheduling module 302,

The scheduling module 302 schedules heterogeneous device resources for the task request in accordance with data information in the task request and a sum of available resources of the heterogeneous cluster.

Take the deep learning network training task as an example. The scheduling module 302 schedules heterogeneous device resources for the task request in accordance with training information in the task request and a sum of available resources of the heterogeneous cluster; preferably, the scheduling module 302 employ a three-level scheduling mode, and determine the number of desired heterogeneous devices according to a size of training data of the deep learning task and a computing capability of the heterogeneous devices. For example, when the data is smaller than 10 GB, the data is scheduled to a single heterogeneous device for operation; when the data is larger than 10 GB and less than 1 TB, the data is scheduled to four heterogeneous devices for operation; when the data is larger than 1 TB, the data is scheduled to the whole heterogeneous cluster for operation.

If the sum of the available resources of the heterogeneous cluster cannot meet the task request, the task request is enabled to enter a waiting state.

If the sum of the available resources of the heterogeneous cluster can meet the task request, it is feasible to schedule the heterogeneous device for the task request, and regard the heterogeneous device as a computing node.

In a preferred implementation mode of the deploying module 303,

The compiling the basic execution environment into an execution environment corresponding to the scheduled heterogeneous device comprises: according to the type of the heterogeneous device scheduled for the task request, the deploying module 303 switches the heterogeneous high-performance repository of the CPU version into the heterogeneous high-performance repository corresponding to the scheduled heterogeneous device, and construct the execution environment corresponding to the type of the scheduled heterogeneous device and packs and deploys the execution environment on the scheduled heterogeneous device.

For example, when the heterogeneous device scheduled by the scheduling module 302 is one or more of the GPU, FPGA and ARM, it is necessary to switch the heterogeneous high-performance repository of the CPU version into the heterogeneous high-performance repository of the GPU, FPGA or ARM version corresponding to the scheduled heterogeneous device; when the heterogeneous device scheduled by the scheduling module 302 is GPU, it is unnecessary to switch the heterogeneous high-performance repository of the CPU version.

Take the deep learning network training task as an example. A deep learning network including a training network and a testing network is generated by using the execution environment according to the network configuration of the task in the task request.

The training network is a deep learning network structure used by during execution of the training task, and the testing network is a deep learning network structure used upon prediction. Specific structures and related parameters of the training network and testing network may be modified and defined according to needs.

In a preferred implementation mode of the execution module 304,

The executing module 304, according to the task request, generates a task instruction instructing the scheduled heterogeneous device to perform distributed computation.

Take the deep learning network training task as an example. It is feasible to send the task instruction to the scheduled heterogeneous device, trigger the scheduled heterogeneous device to obtain the training data from the shared memory according to the training information of the task in the task instruction, and train the deep learning network.

In a preferred implementation mode of the present embodiment, the apparatus further comprises a monitoring module configured to provide an execution progress of the task request in real time.

Preferably, the monitoring module periodically sends a task status query request to the scheduled heterogeneous device; obtains the execution progress for the task request found by the scheduled heterogeneous device by querying according to the task status query request. The monitoring module, through the front-end page of the Web, provides the user with the scheduled heterogeneous device's execution progress for the task request.

Preferably, the scheduled heterogeneous device regularly sends the execution progress of the task request to the monitoring module, and the monitoring module, through the front-end page of the Web, provides the user with the scheduled heterogeneous device's execution progress for the task request.

In embodiments of the present invention, compiling the basic execution environment into the execution environment corresponding to the scheduled heterogeneous device only requires the user to provide the basic execution environment with respect to the task, and does not require the user to respectively write a version of execution environment for each type of hardware platform, thereby implementing quick development of the heterogeneous device code and reducing the development and maintenance costs.

In the embodiments provided by the present disclosure, it should be understood that the revealed method and apparatus can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

Figure 4:
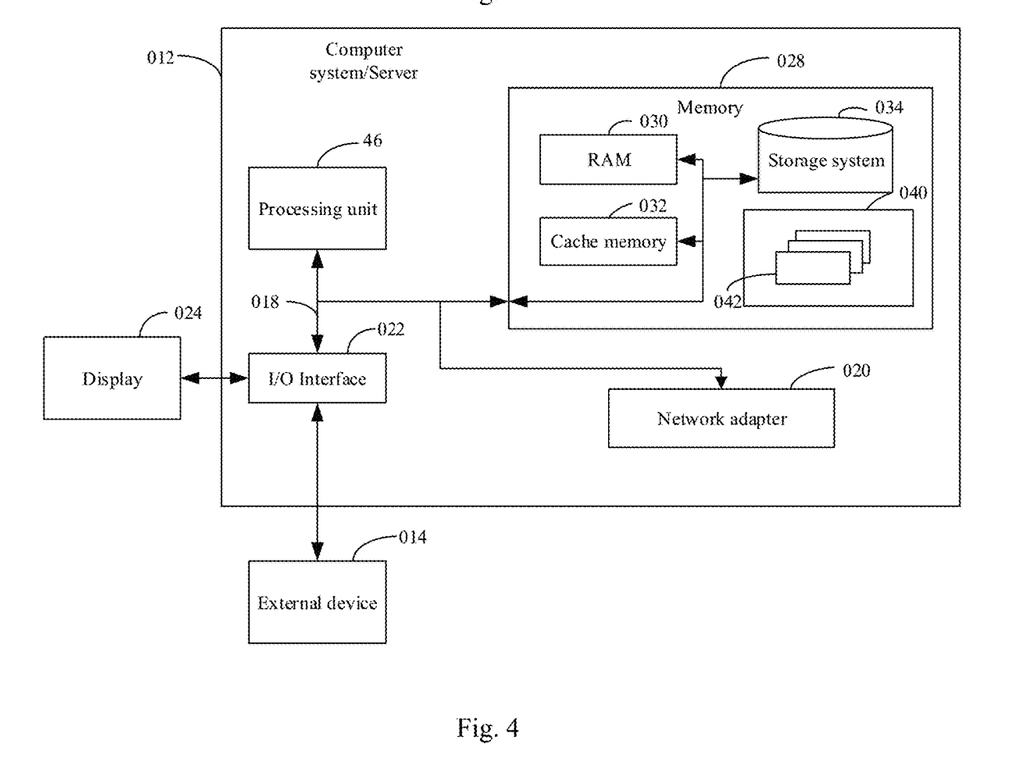
FIG. 4 is a block diagram of an exemplary computer system/server 012 adapted to implement the embodiment of the present disclosure.

FIG. 4 illustrates a block diagram of an example computer system/server 012 adapted to implement an implementation mode of the present disclosure. The computer system/server 012 shown in FIG. 4 is only an example and should not bring about any limitation to the function and scope of use of the embodiments of the present disclosure.

As shown in FIG. 4, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in embodiments described in the present disclosure by running programs stored in the memory 028.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not cause essence of corresponding technical solutions to depart from the spirit and scope of technical solutions of embodiments of the present disclosure.

What is claimed is:

1. A method for processing a heterogeneous cluster-oriented task, wherein the method comprises:
   receiving a task request and a basic execution environment; wherein the basic execution environment is based on a CPU-type heterogeneous high-performance repository;
   scheduling a heterogeneous device according to the task request;
   compiling the basic execution environment into an execution environment corresponding to the scheduled heterogeneous device, and deploying the execution environment corresponding to the scheduled heterogeneous device on the scheduled heterogeneous device; wherein the execution environment corresponding to the scheduled heterogeneous device comprises at least one type of GPU, FPGA or ARM; and
   triggering the scheduled heterogeneous device to execute the task request,
   wherein the compiling the basic execution environment into an execution environment corresponding to the scheduled heterogeneous device comprises:
   according to the type of the heterogeneous device scheduled for the task request, switching the CPU-type heterogeneous high-performance repository into the heterogeneous high-performance repository corresponding to the scheduled heterogeneous device, to generate the execution environment corresponding to the scheduled heterogeneous device.

2. The method according to claim 1, wherein
   the task request comprises: an identity of the basic execution environment, configuration information of the task, and data information of the task.

3. The method according to claim 2, wherein the triggering the scheduled heterogeneous device to execute the task request comprises:
   sending to the scheduled heterogeneous device a task instruction including data information of the task, so that the scheduled heterogeneous device performs distributed computation according to the task instruction.

4. The method according to claim 1, wherein the scheduling a heterogeneous device according to the task request comprises:
   scheduling the heterogeneous device for the task request in accordance with the data information of the task in the task request and a sum of available resources of the heterogeneous cluster.

5. A computer device, comprising a memory, a processor and a computer program which is stored on the memory and runnable on the processor, wherein the processor, upon executing the program, implements a method for processing a heterogeneous cluster-oriented task, wherein the method comprises:
   receiving a task request and a basic execution environment; wherein the basic execution environment is based on a CPU-type heterogeneous high-performance repository;
   scheduling a heterogeneous device according to the task request;
   compiling the basic execution environment into an execution environment corresponding to the scheduled heterogeneous device, and deploying the execution environment corresponding to the scheduled heterogeneous device on the scheduled heterogeneous device; wherein the execution environment corresponding to the scheduled heterogeneous device comprises at least one type of GPU, FPGA or ARM; and
   triggering the scheduled heterogeneous device to execute the task request,
   wherein the compiling the basic execution environment into an execution environment corresponding to the scheduled heterogeneous device comprises:
   according to the type of the heterogeneous device scheduled for the task request, switching the CPU-type heterogeneous high-performance repository into the heterogeneous high-performance repository corresponding to the scheduled heterogeneous device, to generate the execution environment corresponding to the scheduled heterogeneous device.

6. The computer device according to claim 5, wherein
   the task request comprises: an identity of the basic execution environment, configuration information of the task, and data information of the task.

7. The computer device according to claim 6, wherein the triggering the scheduled heterogeneous device to execute the task request comprises:
   sending to the scheduled heterogeneous device a task instruction including data information of the task, so that the scheduled heterogeneous device performs distributed computation according to the task instruction.

8. The computer device according to claim 5, wherein the scheduling a heterogeneous device according to the task request comprises:
   scheduling the heterogeneous device for the task request in accordance with the data information of the task in the task request and a sum of available resources of the heterogeneous cluster.

9. A non-transitory computer-readable storage medium on which a computer program is stored, wherein the program, when executed by a processor, implements a method for processing a heterogeneous cluster-oriented task, wherein the method comprises:
   receiving a task request and a basic execution environment; wherein the basic execution environment is based on a CPU-type heterogeneous high-performance repository; scheduling a heterogeneous device according to the task request;
   compiling the basic execution environment into an execution environment corresponding to the scheduled heterogeneous device, and deploying the execution environment corresponding to the scheduled heterogeneous device on the scheduled heterogeneous device; wherein the execution environment corresponding to the scheduled heterogeneous device comprises at least one type of GPU, FPGA or ARM; and
   triggering the scheduled heterogeneous device to execute the task request,
   wherein the compiling the basic execution environment into an execution environment corresponding to the scheduled heterogeneous device comprises:
   according to the type of the heterogeneous device scheduled for the task request, switching the CPU-type heterogeneous high-performance repository into the heterogeneous high-performance repository corresponding to the scheduled heterogeneous device, to generate the execution environment corresponding to the scheduled heterogeneous device.

10. The non-transitory computer-readable storage medium according to claim 9, wherein
    the task request comprises: an identity of the basic execution environment, configuration information of the task, and data information of the task.

11. The non-transitory computer-readable storage medium according to claim 10, wherein the triggering the scheduled heterogeneous device to execute the task request comprises:

sending to the scheduled heterogeneous device a task instruction including data information of the task, so that the scheduled heterogeneous device performs distributed computation according to the task instruction.

12. The non-transitory computer-readable storage medium according to claim 9, wherein the scheduling a heterogeneous device according to the task request comprises:

scheduling the heterogeneous device for the task request in accordance with the data information of the task in the task request and a sum of available resources of the heterogeneous cluster.

\* \* \* \* \*